United States Patent
Baechle et al.

[15] 3,656,899
[45] Apr. 18, 1972

[54] PROCESS FOR THE MANUFACTURE OF NITROUS OXIDE

[72] Inventors: Hans Tuisko Baechle, Glashutten, Taunus; Rudolf Kohlhaas, Frankfurt/Main, both of Germany

[73] Assignee: Farbwerke Hoechst Aktiengesellschaft vormals Meister Lucius & Bruning, Frankfurt/Main, Germany

[22] Filed: Mar. 27, 1970

[21] Appl. No.: 23,305

[30] Foreign Application Priority Data

Apr. 25, 1969 Germany.....................P 19 21 181.5

[52] U.S. Cl...............................................................23/158
[51] Int. Cl. .........................................................C01b 21/22
[58] Field of Search.........................................23/158, 103

[56] References Cited

UNITED STATES PATENTS

R19,953  5/1936  Friederich .............................23/158
1,315,674  9/1919  Landis ....................................23/103

FOREIGN PATENTS OR APPLICATIONS 534,248  12/1956  Canada...................................23/158
506,542  9/1930  Germany................................23/158

OTHER PUBLICATIONS

"Chemical Abstracts," Vol. 55, pp. 11035– 11036, June 1961.
Smit, J. Van R., in "Chemistry and Industry," London, Dec. 1964, pp. 2018– 2020.

Primary Examiner—Oscar R. Vertiz
Assistant Examiner—G. O. Peters
Attorney—Curtis, Morris & Safford

[57] ABSTRACT

To produce $N_2O$, ammonium nitrate is decomposed in an aqueous, chloride-containing solution in nitric acid while an ammonia atmosphere is maintained above the reaction mixture. The preferred temperature range of the solution is 110°–125° c. The atmosphere of ammonia is maintained by introducing at least part of the required ammonia into the gas volume of the reaction vessel. The decomposition of the ammonium nitrate and the formation of $N_2O$ is enhanced by the presence of catalytically active ions of manganese, copper, cerium, lead, bismuth, cobalt and nickel; manganese, especially in its bivalent form, being preferred.

6 Claims, 1 Drawing Figure

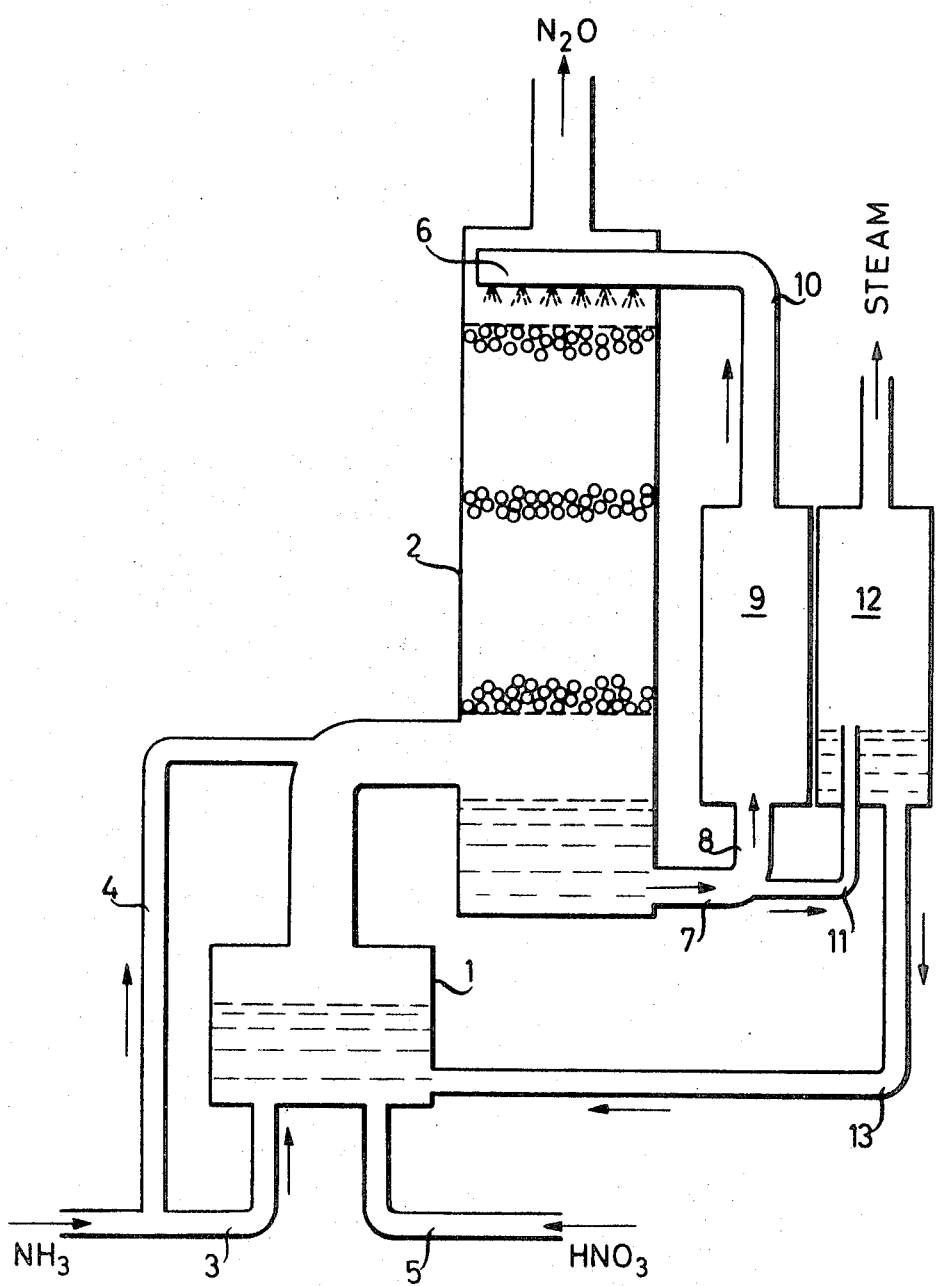

PROCESS FOR THE MANUFACTURE OF NITROUS OXIDE

The present invention relates to a process for the manufacture of nitrous oxide (laughing gas) for aqueous solutions containing ammonium nitrate.

Laughing gas is generally obtained on an industrial scale by the decomposition of molten ammonium nitrate. This kind of manufacture is connected with difficulties inasmuch as higher standards with regard to the safety of operations have to be met with since the decomposition of ammonium nitrate readily causes explosions.

U.S. Pat. No. 3,411,883 describes a process for the manufacture of nitrous oxide at temperatures within the range of from 100° to 145° C. from chloride-containing aqueous solutions of nitric acid which contain ammonium nitrate. This process requires considerable amounts of heat.

Now we have found a process for the manufacture of nitrous oxide by decomposing ammonium nitrate in aqueous chloride-containing solutions of nitric acid at temperatures within the range of from 100° to 160° C., which comprises preparing the ammonium nitrate from ammonia and nitric acid in the reaction vessel and maintaining an ammoniacal atmosphere above the solution.

The conversion of ammonia and nitric acid in the reaction vessel to yield ammonium nitrate and the subsequent decomposition of the ammonium nitrate in the solution take place preferably at temperatures within the range of from 110° to 125° C. The ammoniacal atmosphere above the solution of nitric acid containing ammonium nitrate is maintained by introducing part of the required ammonia into the gas volume of the reaction vessel.

The decomposition of the ammonium nitrate, which has formed, in the aqueous solution may be carried out in the presence of catalysts which leads to a substantial increase of the speed of formation of nitrous oxide. As catalysts there are used manganese-, copper-, cerium-, lead-, bismuth-, cobalt- or nickel ions or the mixtures thereof. These metal ions are introduced into the reaction vessel in the form of the usual salts such, for example, as nitrates, chlorides or sulfates. It is, of course, possible to use also other, preferably soluble compounds of the aforesaid metals. A highly effective catalyst is manganese, especially in its bivalent form. The amount of the catalytically active metal ions added depends on the content of ammonium nitrate of the solution in the reaction vessel. When the decomposition solution has a high content of ammonium nitrate, a higher amount of catalytically active metal ions should be added than when the solution has a lower content of ammonium nitrate. The amount of catalytically active metal ions added should not exceed 10 mole percent (calculated on the ammonium nitrate present in the reaction solution) because otherwise probably the solubility of the ammonium nitrate in the aqueous solution would be repressed. The optimum amount of the catalyst addition lies approximately within the range of from 0.5 to 3.5 mole percent of the catalytically active metal ion, calculated on the ammonium nitrate. With the use of the especially preferred manganese-II-ion, it is possible, without leaving the optimum range, to increase the amount added up to 5 mole percent of manganese ions, calculated on the ammonium nitrate.

It has been found, unexpectedly, that the catalysts not only increase the speed of formation of the nitrous oxide but that the catalysts also enable the use of contaminated starting materials without deminution of the speed of formation of the nitrous oxide.

The attached figure shows, as an example of an embodiment of the invention, a device for carrying out the method. For the sake of clearness, the drawing does not show pumps, valves, control- and metering devices.

In the drawing, the reaction vessel is subdivided into a decomposition flask 1 and a column 2. It is, of course, possible to design the reaction vessel as a unit or to effect sub-division such that the reaction vessel comprises more than two stages. To carry out the process, gaseous ammonia is introduced by way of conduits 3 and 4 into the decomposition flask 1 and into the gas volume of the entire reaction vessel. The ammonia flowing in by way of conduit 4 serves to maintain the ammoniacal atmosphere above the decomposing solution containing ammonium nitrate. By way of a conduit 5, nitric acid flows at a concentration of from 30 percent to 100 percent into the decomposition flask. To accelerate the decomposition of the ammonium nitrate which is formed in the aqueous solution of nitric acid, a low content of chloride ions is maintained in this solution by adding chloride-containing compounds once or continuously. As chloride-containing compounds there are used, in general, hydrochloric acid or ammonium chloride. The content of chloride ions is normally less than 0.2 percent. An increased chloride content is not harmful but leads to increased chloride losses in the form of entrained or sublimed ammonium chloride. When starting the operation, at least a partial amount of these chloride-containing compounds is introduced into the decomposition flask. As soon as the process of the invention has reached the stationary state, a possibly necessary further addition of chloride-containing compounds may be effected in all parts of the apparatus represented on the drawing.

Ammonia and nitric acid react in the decomposition flask in an exothermic reaction to yield ammonium nitrate. The decomposition of ammonium nitrate to yield nitrous oxide is likewise exothermic. Owing to the liberated amounts of heat, the solution in the decomposition flask is likewise heated at temperatures ranging from 100° to 160° C. This solution has approximately the following composition:

15 to 35 percent by weight of nitric acid
30 to 50 percent by weight of ammonium nitrate
15 to 55 percent by weight of water
0.01 to 0.1 percent by weight of chlorine ions and, if necessary, catalytically active amounts of the aforesaid metal ions. The nitrous oxide forming during the decomposition process and the water vapor formed rise from the decomposition flask into column 2. In addition to water vapor, the nitrous oxide formed still contains entrained nitric acid, nitrosyl chloride, ammonium nitrate and traces of nitrogen and other nitric oxides. When these gases rise from the decomposition flask into the column they intermingle with the ammoniacal atmosphere above the solution. To keep up this atmosphere, the gaseous ammonia is used which is fed by way of conduit 4 into the gas volume of the reaction vessel. The ammonia neutralizes the entrained acid constituents of the decomposition solution. The heat of neutralization formed heats up the lower parts of the column, the hot gases are cooled by atomizing an aqueous solution of ammonium nitrate into the upper part of the column whereby the water portion of the gas is condensed in the upper and in the central zone of the column. Simultaneously the ammonium salts which have been entrained or which have formed are washed out and dissolved.

The solution which has been introduced by atomization and which has absorbed the condensed water and the constituents formed or entrained in the gas volume collects in the sump of the column. The solution in the sump of the column has a temperature within the range of from 50° to 110° C. The major part of the solution from the sump of the column is pumped by way of conduits 7 and 8 into a heat exchanger 9, from where, after it has cooled, it is recycled into the column by way of a conduit 10 and spraying nozzles 6. The heat energy obtained in a heat exchanger 9 serves to heat an evaporator 12. A minor part of the solution originating from the sump of the column is introduced by way of a conduit 11 into said evaporator and is concentrated while using the heat obtained in the heat exchanger. The operation is preferably carried out under reduced pressure. However, it is also possible to operate under normal pressure. When the solution which is introduced by atomization and the solution which is discharged from the sump of the column are adjusted at a lower temperature (approximately within the range of from 50° to 80° C.), the evaporation of the water is accelerated by an additional heater. The solution containing ammonium nitrate, which is concentrated in the evaporator, is recycled by way of a conduit 13 into the decomposition flask 1.

Suitable devices for measuring the pH value are installed to supervise the pH value of the recycled solution which is atomized into the column, the pH value being adjusted within the range of from 6.3 to 10.5, if necessary, by a slight addition of nitric acid or ammonia. The solution which is introduced into the evaporator 12 is generally still controlled by separate devices, and the pH value of the solution is preferably rendered weakly acid by the addition of slight amounts of an acid whereby losses of ammonia in the evaporator are avoided. Also the content of chloride (ammonium chloride) has to be controlled when the operation is out continuously. In case of losses, ammonium chloride or hydrochloric acid is reintroduced in slight controlled amounts either continuously or as it is required.

EXAMPLE 1

An apparatus for the preparation of nitrous oxide is constructed in accordance with the accompanying drawing. A glass flask (decomposition flask) having a capacity of 20 liters and a 3 m. long column serve as the reaction vessel. The column has a diameter of 10 cm.; the upper part of the column is filled with Raschig rings (6 mm.). One or several spraying nozzles are installed at the head of the column; the solution to be introduced by atomization flows from the heat exchanger through a conduit to the spraying nozzles. The sump of the column is connected by way of conduits with the heat exchanger as well as with the evaporator. The evaporator consists of a 20-liter glass flask. A conduit is likewise installed between the decomposition flask and the evaporator.

At the beginning of the operation, a total of 750 grams of ammonium chloride or corresponding amounts of hydrochloric acid is charged into the reaction system in corresponding partial steps. Nitric acid and ammonia are carefully charged into the decomposition flask. As soon as the reaction proceeds in a stationary manner, 6.56 liters of pure nitric acid of 50 percent strength and 864 liters of ammonia gas are introduced per hour, under normal pressure directly into the solution. In the decomposition flask, ammonium nitrate is formed in an exothermic reaction in a solution of nitric acid. The solution heats up to a temperature of from 116° to 118° C., in which process nitrous oxide is formed at a rate of approximately 0.5 mole of nitrous oxide per mole of ammonium nitrate per hour.

The rising nitrous oxide still contains, immediately above the solution, a large amount of water vapor, nitric acid, nitrogen dioxide, nitrogen monoxide as well as traces of hydrochloric acid, chlorine, nitrosyl chloride and nitrogen. The ammoniacal atmosphere above the decomposing solution brings about a neutralization of the constituents having an acid reaction. The alkaline atmosphere in the gas volume is maintained by introducing 712 liters of ammonia per hour by way of conduit 4. The rising hot ammoniacal gases enter the column. A dilute solution of ammonium nitrate having a pH value of about 7.8 is atomized at a temperature of about 60° to 70° C. into the upper part of the column. The rising hot gas contacts the solution which is introduced by atomization, while the portion of water vapor condenses and the surplus ammonia and the salts formed are dissolved. About 98 percent of the crude laughing gas, which is removed from the upper part of the column and which is then scrubbed and dried, consists of nitrous oxide. The remainder consists substantially of nitrogen.

The dilute solution of ammonium nitrate which is introduced by atomization is heated by the contact with the hot gases and by the condensation of the water vapor to temperatures of about 80° to 100° C. The solution now contains, in addition to ammonium nitrate, still minor amounts of ammonium chloride and of free ammonia. The solution collects in the sump of the column and is discharged at a rate of about 200 liters/hour. About 190 liters thereof are cooled per hour by means of the heat exchanger and are recycled into the column. The remaining 10 liters are introduced, with the addition of about 64 ml. of nitric acid of 50 percent strength, into the evaporator having a capacity of 20 liters. These 10 liters of a dilute aqueous solution of ammonium nitrate, which are obtained per hour, practically constitute the water portion originating from the decomposition reaction of the ammonium nitrate, which portion is condensed in the column. In the stationary state, approximately 7 liters of water thereof are removed in the evaporator. The solution in the evaporator has a pH value of about 4.5 and is concentrated to yield a solution of ammonium nitrate of about 68 percent. About 3.2 kg./hour of this concentrated solution are conveyed from the evaporator to the decomposition flask.

In the stationary state, there are obtained about 1,540 liters/hour of a crude laughing gas having the above-indicated composition. The yield, calculated on the nitric acid applied, thus amounts to about 97.5 percent.

EXAMPLE 2

In a manner analogous to that described in Example 1, ammonia and technical grade nitric acid are converted to yield nitrous oxide, the decomposition being carried out in the presence of catalysts. The sequence of enumeration shows the influence of the addition of certain metal compounds on the speed of formation of the nitrous oxide.

Owing to the accelerated speed of formation, the space/time yield can be appreciably increased. Thus the introduction of 400 grams of cobaltous nitrate into the apparatus according to Example 1 brings about an increase of the conversion to a consumption of 2,060 liters of ammonia and 7.0 liters of technical grade nitric acid of 61 percent strength. The yield of laughing gas then increases to about 2,000 liters.

| Catalyst | Type and amount of compound added | Rate of formation (mole $N_2O$/mole $NH_4NO_3 \cdot h$) |
| --- | --- | --- |
| without | – | 0.5 |
| Mn ions | 0.385 kg $Mn(NO_3)_2 \cdot 6H_2O$ | 0.70 |
| Mn ions | 1.93 kg $Mn(NO_3)_2 \cdot 6H_2O$ | 0.90 |
| Mn ions | 3.85 kg $Mn(NO_3)_2 \cdot 6H_2O$ | 0.82 |
| Mn ions | 1.60 kg $MnSO_4 \cdot 5H_2O$ | 0.90 |
| Mn ions | 0.21 kg $KMnO_4$ | 0.65 |
| Cu ions | 0.40 kg $Cu(NO_3)_2 \cdot 6H_2O$ | 0.64 |
| Ce ions | 0.54 kg $Ce(SO_4)_2 \cdot 4H_2O$ | 0.65 |
| Pb ions | 0.445 kg $Pb(NO_3)_2$ | 0.64 |
| Bi ions | 0.65 kg $Bi(NO_3)_3 \cdot 5H_2O$ | 0.60 |
| Co ions | 0.40 kg $Co(NO_3)_2 \cdot 6H_2O$ | 0.65 |
| Ni ions | 0.40 kg $Ni(NO_3)_2 \cdot 6H_2O$ | 0.70 |

We claim:

1. In a process for the manufacture of nitrous oxide from ammonium nitrate in an aqueous solution of nitric acid containing chloride ions, the improvement which comprises decomposing the ammonium nitrate at a temperature of 100°–160° C. in a reaction vessel while maintaining an ammoniacal atmosphere above the solution in said vessel, and scrubbing the evolved gases with an aqueous solution of ammonium nitrate.

2. The process as claimed in claim 1, wherein the solution in the reaction vessel consists of 15 to 35 percent by weight of nitric acid, 30 to 50 percent by weight of ammonium nitrate, 0.01 to 0.1 percent by weight of chlorine ions, and the remainder is water.

3. The process as defined in claim 1, wherein the decomposition reaction is carried out in the presence of a catalytically active amount of cerium-, lead-, or nickel ions or a mixture thereof.

4. The process as claimed in claim 3, wherein the catalytically active ions are present in an amount of up to 10-mole percent, calculated on the ammonium nitrate contained in the solution of nitric acid.

5. The process as claimed in claim 1, wherein the water content of the ammonium nitrate solution is adjusted by evaporation in an evaporator.

6. The process defined in claim 1, wherein the decomposition of ammonium nitrate is carried out in a continuous manner with a partial amount of the aqueous ammonium nitrate solution being recycled to the reaction vessel.

* * * * *